United States Patent [19]

Weinert

[11] 4,181,226
[45] Jan. 1, 1980

[54] PLASTIC BUCKET

[75] Inventor: Franz Weinert, Hamburg, Fed. Rep. of Germany

[73] Assignee: Firma Weinert & Co., Hamburg, Fed. Rep. of Germany

[21] Appl. No.: 870,575

[22] Filed: Jan. 18, 1978

[30] Foreign Application Priority Data

Jan. 29, 1977 [DE] Fed. Rep. of Germany ....... 2703721

[51] Int. Cl.² ...................... B65D 21/00; B65D 25/32
[52] U.S. Cl. ...................................... 206/519; 220/91; 220/95
[58] Field of Search ...................... 206/515, 519, 520; 220/91, 95, 519,

[56] References Cited

U.S. PATENT DOCUMENTS

| 3,077,284 | 2/1963 | McLaughlin | 206/519 X |
| 3,128,905 | 4/1964 | Hesslein | 220/91 X |
| 3,353,707 | 11/1967 | Eyles | 206/519 |
| 3,425,471 | 2/1969 | Yates, Jr. | 220/91 |
| 3,759,416 | 9/1973 | Constantine | 220/72 X |
| 3,915,363 | 10/1975 | Frankenberg | 220/91 X |

FOREIGN PATENT DOCUMENTS

| 128482 | 7/1948 | Australia | 220/91 |
| 2328618 | 5/1977 | France | 220/91 |
| 722573 | 1/1955 | United Kingdom | 220/91 |
| 728173 | 4/1955 | United Kingdom | 220/91 |

Primary Examiner—Allan W. Shoap
Attorney, Agent, or Firm—Michael J. Striker

[57] ABSTRACT

A bucket has a tapered tubular side wall including a wide rim-forming end and a narrow end, and a bail having ends secured to the side wall adjacent the wide end. The side wall is formed with at least one elongated portion forming an inwardly convex projection defining an outwardly open groove and extending from adjacent the wide end past the base wall. The side wall further having a web bridging the end of the groove adjacent the wide end and formed with a holder for an end of the bail.

12 Claims, 4 Drawing Figures

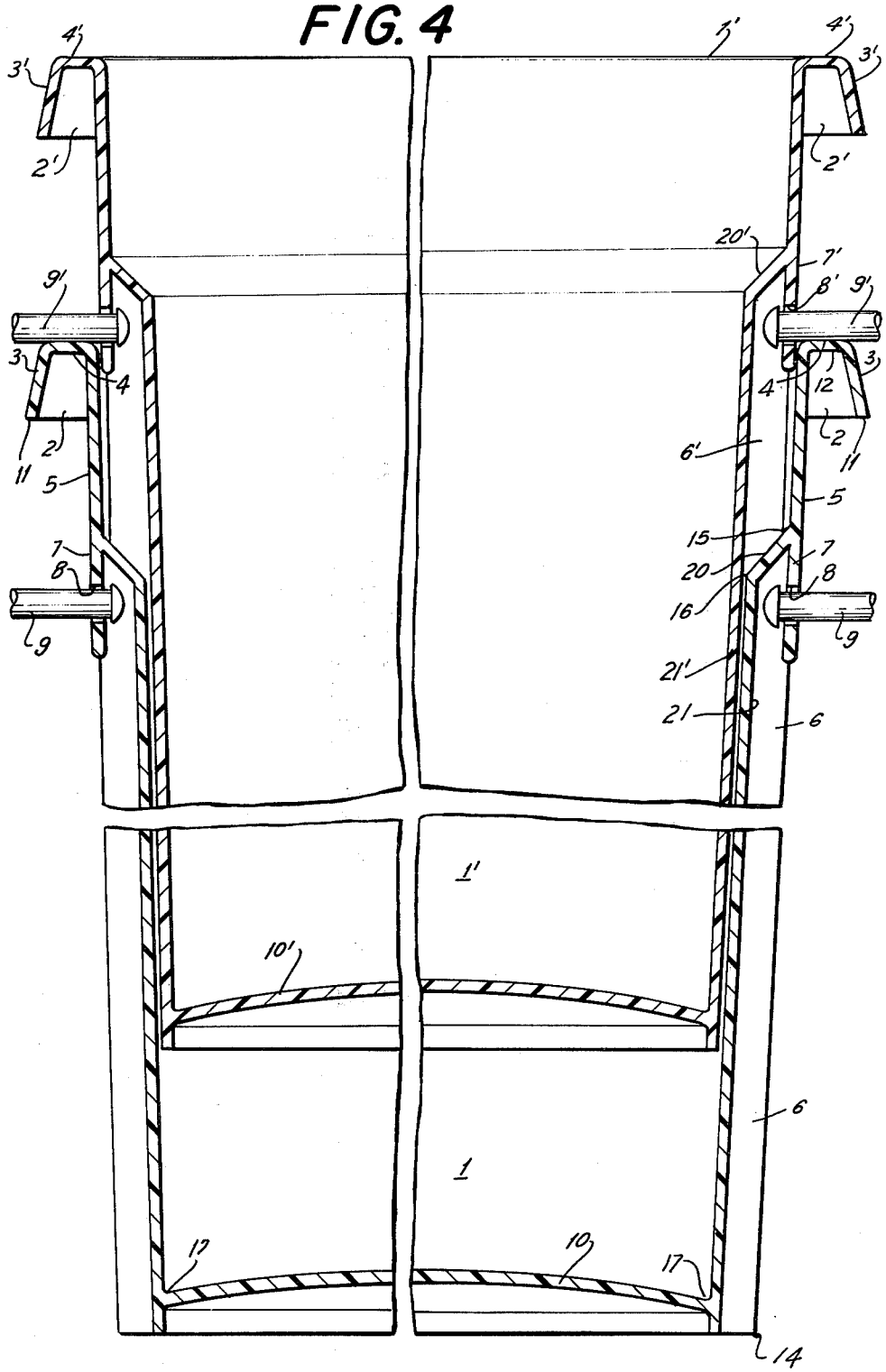

PLASTIC BUCKET

BACKGROUND OF THE INVENTION

The invention relates to a plastic bucket having a hinged bail and an outwardly flanged collar at its brim.

Generally, it is desirable to make buckets with a uniform tapered shape and size so that, when empty, each bucket can be fitted within another to form a stack. A stack of buckets provides economy of space, a particularly desirable feature for anyone transporting the buckets.

With efforts to make the tacking more efficient, certain problems have become apparent. Conventional buckets are susceptible to being jammed when stacked. Consequently, it may be difficult to separate the lower buckets of the stack. One proposal for solving this longstanding problem involved the arrangement of radially projecting cross bars on the upper periphery of the bucket's outer wall. As the bucket was fitted into another, the cross bar of the former would be propped by the brim of the collar of the latter. The effect was to prevent one bucket from sinking too deeply into another, this deep sinking being held responsible for consequent jamming. As put into practice up to now, this proposal has arranged the cross bars below the mounting for the ends of the bail.

The disadvantage of this conventional arrangement is that buckets in the stack can be twisted relative to one another so that their bails do not lie even with each other. This is particularly disadvantageous because the folded-down bails can be twisted, particularly if each bucket is removed by a machine from the stack. In addition, the arrangement of the cross bars has meant that the height of the stacks is increased since each cross bar acts as a spacer maintaining the portion of the bucket above the cross bar, in a position above the brim of another bucket. Another disadvantage is that a relatively low location of the cross bars on the bucket makes it difficult to label the bucket since the labelling is done only in portions of the bucket below the cross bars and the presence of the low-lying cross bars diminishes the area of these portions.

Attempts have been made to remedy these problems. One suggestion was to raise the position of the mounting for the bail. However, in practice this solution was unsatisfactory since recesses or collapsed dislocations often appeared near the upper rim of the bucket above the mounting. Consequently, the side walls of the bucket lost their desirable firmness. The reason for this empirical disadvantage was found to be the large material surface required to support the mounting, particularly because the plastic shrinks with the cooling which follows injection molding.

SUMMARY OF THE INVENTION

The main object of the invention is to produce a plastic bucket which can be fitted within another bucket of the same shape so as to form a stack having a minimal height while each bucket is fitted in such a mannner that it can be easily removable from the stack.

Another object of the invention is to produce buckets which, when stacked, are all maintained in a particular orientation relative to each other, the particular orientation being one in which all of the mountings of the buckets are aligned with each other.

In accordance with the inventive concept, the tapered tubular side wall of a bucket is formed with at least one elongated portion which forms an inwardly convex projection defining an outwardly open groove. This projection extends upwardly along the height of the bucket until terminating in an upper portion of the bucket.

The provision of this inwardly convex projection in the side walls of each bucket means that each bucket can be maintained in the same orientation as the other buckets, because each inward projection of one bucket fits into the outwardly open groove of another bucket so that all of the buckets are turned the same way as determined by the position of the groove.

As applied to the conventional problem of twisted bails, the inventive concept is to combine this inwardly convex projection with a web bridging the top end of the groove and to provide the web with a holder or pivotal mounting for an end of the bail. The effect of this inventive combination is that the sinking of one bucket into another proceeds only until the web contacts the top brim of the bucket below. Thus, the bail is positioned outside of the bucket below it and lies to the side of the stack so it is safe from being twisted.

There may be a problem of same slight tilting when only one inwardly convex projection is formed on each bucket. If this slight tilting is undesirable, then it is advantageous to provide each bucket with a second similarly shaped and sized inwardly convex projection diametrically opposite the first. This also improves the rigidity of the buckets.

In another embodiment of the inventive concept, the web bridging the groove is part of an annular side wall which at its top end is formed with the rim of the bucket. The collective height of the annular side wall sections from the mounting to the top rim on all of the buckets determines the height of a stack of buckets. The height of such an annular side section can be decreased by providing the bucket with an increased taper.

In practice, it is advantageous for the inwardly convex projection and its outwardly open groove to extend some distance past the web of the sidewall so that the extending portion of the groove is covered by the web. The ends of the bail can fit within the extended portion of the groove and thereby improve the centering of the buckets in the stack.

The walls defining the inwardly convex projection, and therefore defining the outwardly open groove, preferably have a tapered circular cross section so as to correspond with the tapering of the side wall of the bucket. This cross section can be easily produced in the side wall and makes possible an easy stacking of the buckets. However, there are circumstances in which it is desirable to provide the projection with, for example, a rectangular cross section or a cross section of some alternate form. Preferably, the projection and groove are upwardly conically tapered so as to make stacking easier.

The novel feature which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a section of two stacked buckets.

DETAILED DESCRIPTION OF A PREFERRED EMBODIMENT

Figure 1:
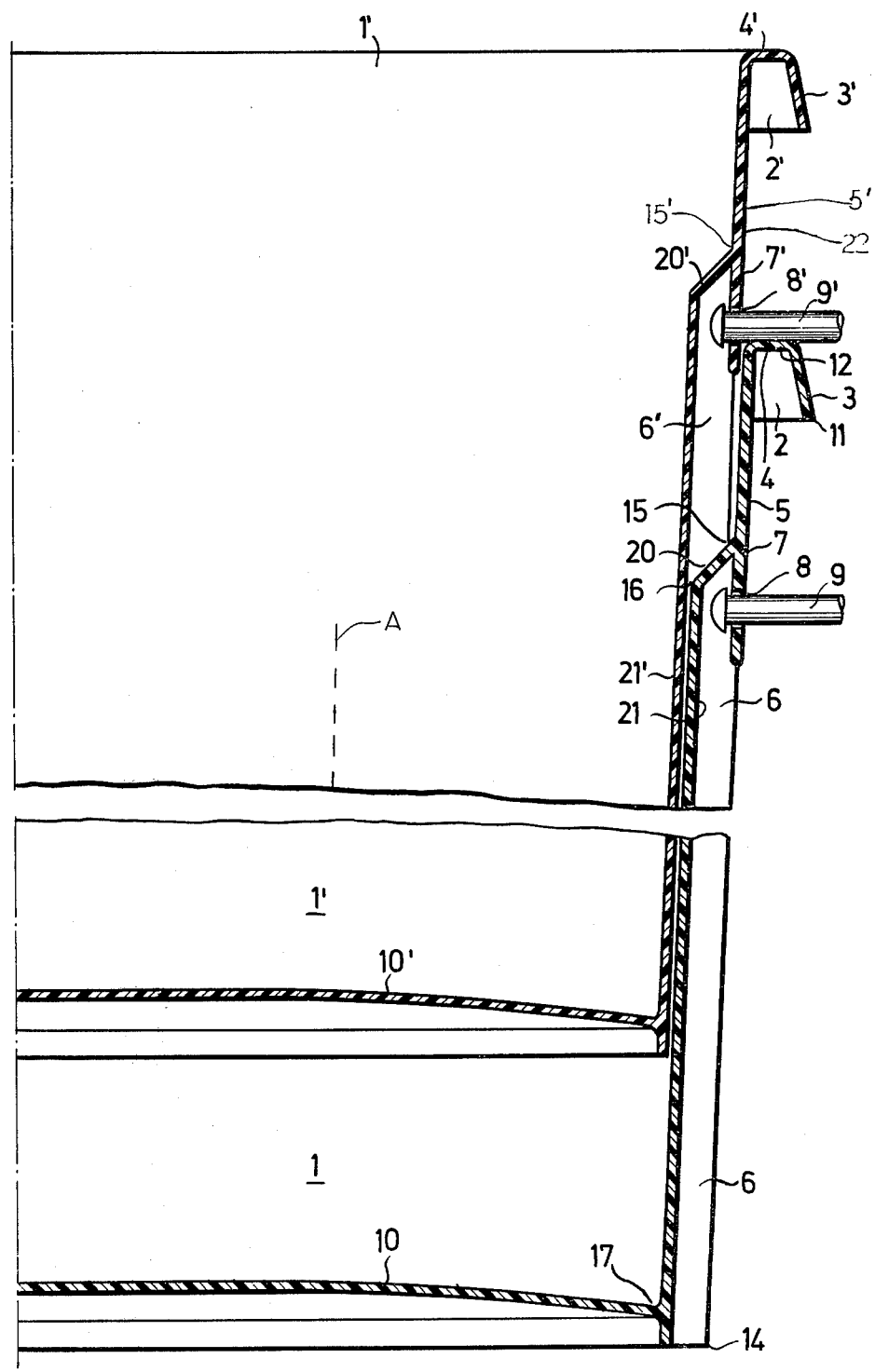
FIG. 1 is a partial section of two stacked buckets made in accordance with the inventive concept.
Figure 2:
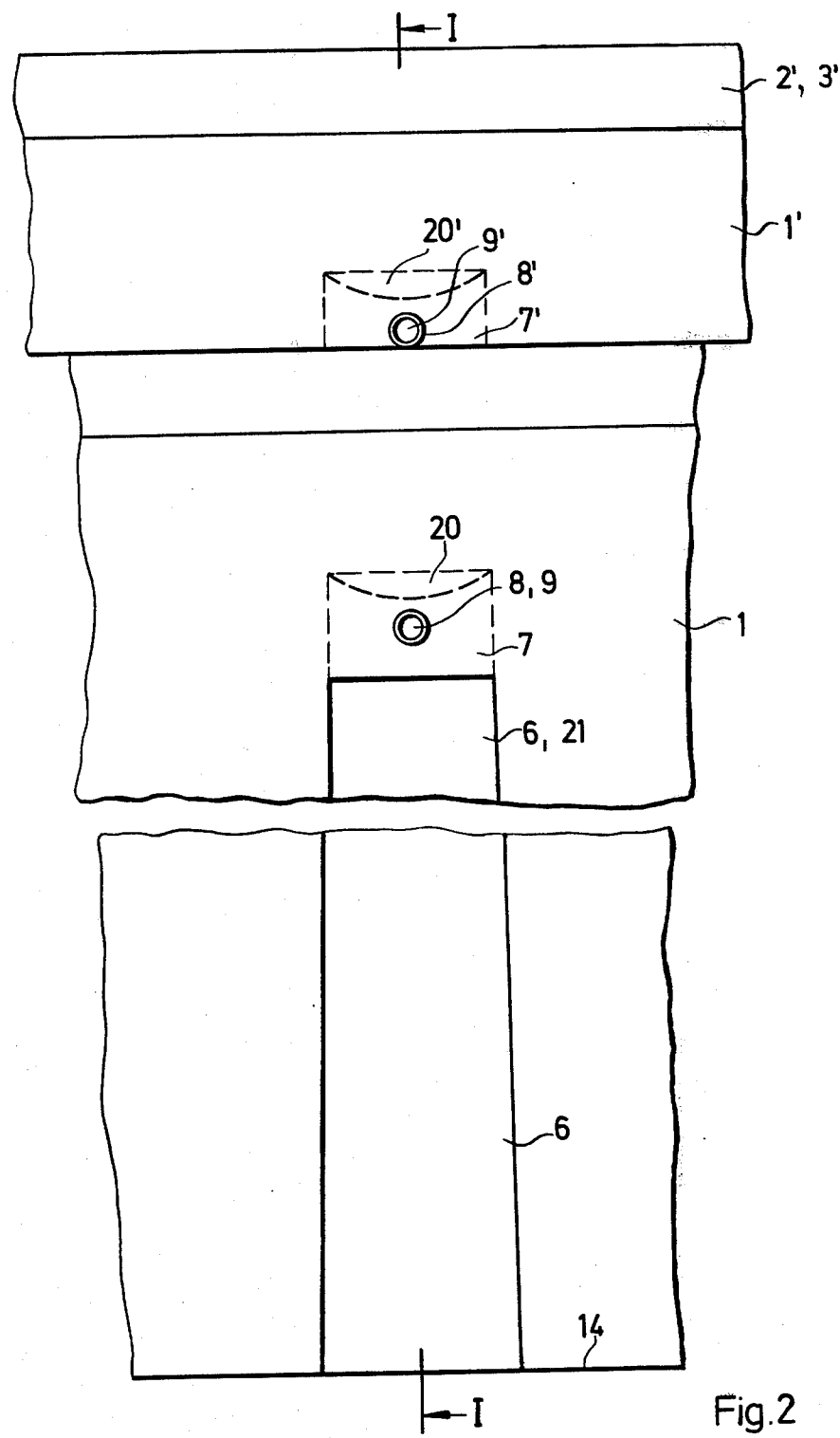
FIG. 2 is a cutaway section of a side view of the stacked buckets.

In FIGS. 1, 2 and 4, the primed reference numbers each refer to a particular element of one bucket and each unprimed reference number refers to the same element of another identical bucket. Henceforth, a particular element will be specified only by its unprimed reference number, but this identification will also pertain to and identify the correspondingly numbered primed element of the other bucket.

Referring to FIGS. 1 and 4, a bucket 1 is provided with an annular collar 2 formed radially about an axis A passing through the center of the bucket 1. A downwardly open, U-shaped lip 3 forms the collar 2. The rim 4 forms the top peripheral margin of the bucket 1. An annular side wall section 5 extends downwardly below rim 4 to an inwardly inclined portion 20 and inner side wall 16 which are together formed with at least one inwardly convex projection 21 which defines an outwardly open groove 6. Projection 21 extends from inwardly inclined portion 20 of the side wall 5 straight down and past the inner bottom wall 10 and to the end of outer bottom wall 14. Groove 6 has a tapered circular cross section, as shown more specifically in FIG. 3. Near its top groove 6 is bridged by web 7 which extends downwardly from the side wall 5. Web 7 is provided with a holder or mounting 8 into which is inserted an end 9 of a bail. This end 9 then fits within the covered portion at 21 of the groove 6. Bucket 1 has a circular cross section and is downwardly tapered.

The height of the portion 22 of the sidewall between the holder 8 and the rim 4 is a critical factor when one is concerned with minimizing the height of a stack of buckets. The height of this portion 22 will extend above the rim of the lower bucket in a stack. This height of portion 22 can be decreased by increasing the tapering of the bucket 1. In accordance with the inventive concept, this portion 22 extends above the rim of the lower bucket because the bail extending through the holder 8 is propped on the rim 4 of the lower bucket.

The rim 4 and the inclined portion 20 of side wall 5 of each stacked bucket except of course the top bucket confine an open area of groove 6 as the inwardly convex projection 21 of another bucket fits along the rest of the groove 6.

Referring to FIG. 2, the groove 6 is shown as being formed with an upwardly tapered shape. At its top end, the groove 6 is defined by inclined portion 20 of side wall section 5.

Figure 3:
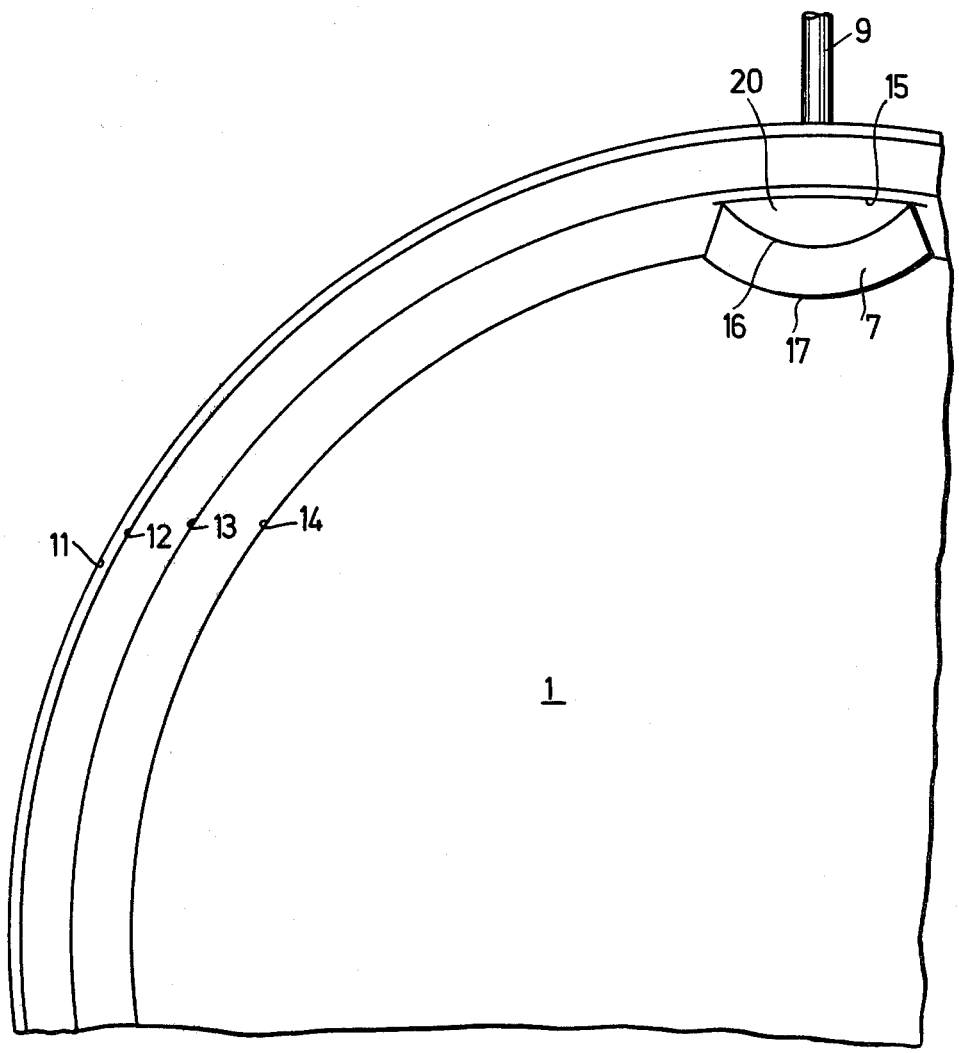
FIG. 3 is a partial top view of a bucket produced in accordance with the inventive concept.

The interior of the bucket 1 is shown as viewed from above in FIG. 3 so as to illustrate the frustoconical shape of the bucket. The bucket tapers downwardly from outer periphery 11 and inner wall 12 of lip 3, past inner wall 13 of the sidewall section 5, past outer edge 15 of inclined portion 20, and past side wall 16, past inner wall 17 of projection 21 and the outer bottom wall 14.

However, the inventive concept does not require that the bucket have a circular cross section. The concept is equally applicable to oval, four-cornered or even rectangularly cross-sectioned buckets.

It will be understood that each of the elements described above, or two or more together, may also find a useful application in other types of a plastic bucket differing from the types described above.

While the invention has been illustrated and described as embodied in a bucket, it is not intended to be limited to the details shown, since various modifications and structural changes may be made without departing in any way from the spirit of the present invention.

Without further analysis, the foregoing will so fully reveal the fist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A bucket, comprising an elongated tubular side wall defining an interior of the bucket and including a wide rim-forming upper end portion and a narrow lower end portion, said side wall being formed with at least one elongated inwardly convex portion forming an outwardly open groove extending inside the interior of the bucket, said side wall further having an integral portion substantially planar with the latter and defining a web at least partially and circumferentially closing said groove so as to define a space between the outer surface of the inwardly convex groove and the inner surface of the web; a completed bail having diametrically opposed ends, each having a first portion pivotally received through a respective hole in said web in said space and a second portion extending outwardly radially away from said first portion and from the interior of the bucket, said second portion of said bail having abutting means for abutting the rim-forming upper end portion of a lower bucket when a plurality of such buckets are rested so as to limit nesting where the respective upper bucket is nested in the respective lower bucket.

2. The bucket of claim 1, said sidewall and its rim-forming upper end and narrow lower end portions being centered on an axis.

3. The bucket of claim 1, said sidewall being formed with two such elongated inwardly convex portions diametrically opposite each other, each defining an outwardly open groove and each extending from adjacent said wide upper end portion, said side wall further having two such webs each bridging the end of a respective one of said grooves adjacent said wide upper end portion.

4. The bucket of claim 3, the sidewall having a circular cross section and being downwardly tapered.

5. The bucket of claim 3, each of said convex portions having an arcuate cross section being upwardly tapered and extending straight down on said side wall, and each of said convex portions being defined by an inwardly inclined top surface and a second surface extending from the buttom of said inclined top surface.

6. The bucket of claim 1, said projection having a part-circular cross section and extending straight on said side wall.

7. The bucket of claim 1, said convex portion being upwardly tapered, and said side wall being downwardly tapered.

8. The bucket of claim 1, the rim-forming upper end portion having a downwardly open, U-shaped lip.

9. The bucket of claim 1, the sidewall being frusto-conical.

10. A bucket as defined in claim 1, wherein said outwardly open groove of the respectively lower bucket receives said inwardly convex portion of the respective upper bucket when the buckets are inserted one in the other, so that any turning of one of the buckets relative to the other is eliminated.

11. A bucket as defined in claim 1; and further comprising means for pivotably receiving said first portion of the bail in said space.

12. A bucket as defined in claim 1, wherein said side wall is of synthetic plastic material.

* * * * *